Figure 1:
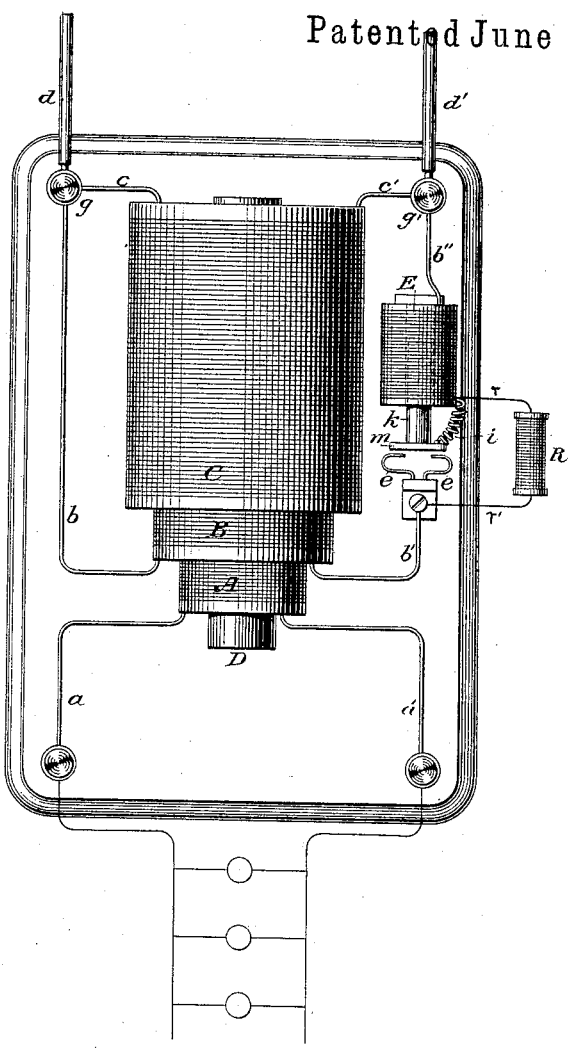

(No Model.)

W. STANLEY, Jr.
INDUCTION COIL.

No. 320,717.      Patented June 23, 1885.

Witnesses
Geo. W. Breck.
Carrie E. Ashley

Inventor
William Stanley, Jr.
By his Attorney
Clarkson A. Collins

UNITED STATES PATENT OFFICE.

WILLIAM STANLEY, JR., OF PITTSBURG, PENNSYLVANIA.

INDUCTION-COIL.

SPECIFICATION forming part of Letters Patent No. 320,717, dated June 23, 1885.

Application filed December 4, 1884. (No model.)

*To all whom it may concern:*

Be it known that I, WILLIAM STANLEY, Jr., a citizen of the United States, residing in the city of Pittsburg, in the county of Allegheny and State of Pennsylvania, have invented certain new and useful Improvements in Induction-Coils, of which the following is a full and exact specification.

My invention is intended to be applied to a system of electrical distribution where there is a main circuit leading from a dynamo-electric machine or other source of electrical energy and local work-circuits containing translating devices; and the object of the device herein described is to generate, by means of the current in the main circuit, induced currents in the work-circuits to operate the translating devices therein, said work-circuits not having electrical connection with the main circuit.

In the drawings, $d\ d'$ represent the wires of a main circuit leading from a generator of electricity, and $a\ a'$ the wires of a work-circuit. The generator with which the wires of the main circuit are connected should be one giving a direct current or a current in one direction only. The wires $a\ a'$ at the end of the work-circuit nearest the main circuit form a coil, A, about an iron core, D. Outside the winding A of the core D is wound a second coil of wire, B, the extremities of which are connected with the mains $d\ d'$ at the points $g\ g'$. Outside of the winding B is wound a third coil of wire, C, the extremities of which are also connected with the mains $d\ d'$ at the binding-screws $g\ g'$. The wire $b''$, which is a continuation of the circuit through the wire $b\ b'$ forming the winding B of the core D, forms the winding of a small solenoid, E, the movable core $k$ of which has a conducting faceplate, $m$, which when the solenoid E is demagnetized rests upon the contact-pieces $e\ e$. One terminal of the wire forming the winding of the solenoid E is connected with the face $m$ of the core $k$ by means of the wire $i$, forming an elastic connection. The wires forming the windings B and C are wound in opposite directions around the core D, one being a left-hand and the other a right-hand winding. R is a resistance-coil or spark-arrester interposed between the plate $m$ and the contacts $e\ e$ by means of the wires $r\ r'$.

The operation of the device is as follows: When no current is passing along the mains $d\ d'$, the solenoid E is demagnetized and the plate $m$ rests upon the contact-pieces $e\ e$, making a closed circuit through the coil B. The circuit through the coil C is a continuously-closed circuit. If now a current passes along the mains $d\ d'$, a portion of it will pass through the coil C and also through the coil B and solenoid E. The solenoid E will be energized and the core $k$ lifted, breaking the contact between the plate $m$ and the contacts $e\ e$ and opening the circuit through the coil B. Thereupon the solenoid E is again demagnetized and the core $k$ drops, making contact between the plate $m$ and the contacts $e\ e$ and closing the circuit through the coil B. In this way a constant trembling motion of the core $k$ is kept up, alternately opening and closing the circuit through the coil B in rapid succession. As the coils B and C are wound in opposite directions about the core D, the magnetizing effect that a current flowing through either of these coils alone would have upon the core D is neutralized when a current is flowing through both by the action of the current flowing through the other and the core D remains unmagnetized. As soon, however, as the circuit through the coil B is opened and current ceases to flow therein the current flowing in the coil C magnetizes the core D, which is again demagnetized when the circuit through the coil B is again closed, thus becoming magnetized and demagnetized alternately in rapid succession. As long as current is flowing in the coil C alone or in both the coils B and C no effect is produced upon the coil A, but as often as current begins or ceases to flow in the coil B an alternating current is generated in the coil A and transmitted through the working-circuit.

The inductive effect upon the coil A is intensified by the presence of the magnetized iron core D, which tends to increase the number of lines of force passing through the coils.

The office of the resistance R is to prevent sparking between the plate $m$ and contacts $e\ e$ when they are separated or brought together.

If desired, the inducing apparatus may be placed at a distance from the main circuit and connected therewith by the wires leading from the terminals of the coils B and C.

Figure 2:
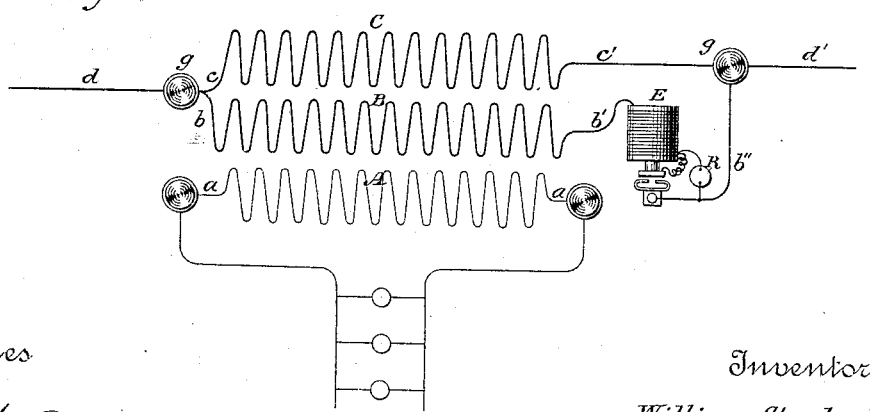

In such an apparatus as I have described the limits of the magnetic field are more extended and its action in inducing current in the secondary coil is more prompt and powerful than in the ordinary form of induction-coil. I do not confine myself to the particular form of construction shown in Figure 1 of the drawings as regards the relative positions of the coils, as it is evident that the construction may be modified in this respect without affecting the results produced so long as the secondary coil remains within the magnetic field of the primaries. Thus the coils may be placed side by side, as shown in the plan view in Fig. 2.

What I claim as new, and desire to secure by Letters Patent, is—

1. In an inducing apparatus, the combination, with a secondary coil in electrical connection with a working-circuit, of two primary coils wound in opposite directions and both in circuit with a source of electrical energy, the one being in a continuously-closed circuit and the other in a circuit adapted to be alternately opened and closed, substantially as set forth.

2. In a system of electrical distribution consisting of a main circuit leading from a generator of electricity and one or more local or work circuits not in electrical connection with the main circuit, the combination, with each of the working-circuits, of an inducing apparatus consisting of two primary coils of wire in electrical connection with the main circuit, a secondary coil located within the magnetic field of the primary coils and in electrical connection with the working-circuit, and means for alternately breaking and closing the circuit through one of the primary coils, substantially as and for the purposes set forth.

3. In an inducing apparatus, the combination of a coil, C, in a continuously-closed circuit with a source of electrical energy, a coil, B, in electrical connection with the same source of energy and adapted to have its circuit alternately broken and closed, and a coil, A, in electrical connection with a circuit containing translating devices, substantially as and for the purposes set forth.

4. In a system of distribution consisting of a main circuit and local or work circuits, the combination, with each working-circuit, of an inducing apparatus consisting of a core, D, a coil, A, in electrical connection with the working-circuit, a coil, B, on an alternately open and closed circuit with the main, and a coil, C, on a continuously-closed circuit with the main, substantially as and for the purposes set forth.

5. In an inducing apparatus, the combination of two coils wound in opposite directions about a central core and both in circuit with a source of electrical energy, the one coil being in a continuously-closed circuit and the other in a circuit adapted to be alternately opened and closed, substantially as and for the purposes set forth.

WILLIAM STANLEY, Jr.

Witnesses:
S. F. RANDALL,
H. L. LUQUES.